May 22, 1962 R. N. QUENNEVILLE 3,035,607
PRESSURE REGULATING APPARATUS FOR FLUID CONDUIT
Filed May 9, 1958 2 Sheets-Sheet 1

*INVENTOR.*
RAYMOND N. QUENNEVILLE
BY
Teller & McCormick
ATTORNEYS

May 22, 1962  R. N. QUENNEVILLE  3,035,607
PRESSURE REGULATING APPARATUS FOR FLUID CONDUIT
Filed May 9, 1958  2 Sheets-Sheet 2

*INVENTOR.*
RAYMOND N. QUENNEVILLE
BY
Teller & McCormick
ATTORNEYS

United States Patent Office 3,035,607
Patented May 22, 1962

3,035,607
PRESSURE REGULATING APPARATUS FOR FLUID CONDUIT
Raymond N. Quenneville, Holyoke, Mass., assignor to United Aircraft Corporation, East Hartford, Conn., a corporation of Delaware
Filed May 9, 1958, Ser. No. 734,343
1 Claim. (Cl. 137—505.18)

This invention relates to pressure regulating apparatus adapted to be coupled in a conduit leading from a source of pressurized gaseous fluid to establish a substantially constant fluid pressure in the conduit downstream of the said apparatus.

It is the general object of the invention to provide dependable, simple and sturdy, automatic pressure regulating apparatus for gaseous fluid systems, which apparatus is adapted to accommodate relatively large gaseous fluid flows at widely varying pressures and to exercise more precise pressure control than has heretofore been achieved under such conditions.

The drawings show a preferred embodiment of the invention and such embodiment will be described, but it will be understood that various changes may be made from the construction disclosed, and that the drawings and description are not to be construed as defining or limiting the scope of the invention, the claim forming a part of this specification being relied upon for that purpose.

Figure 1:
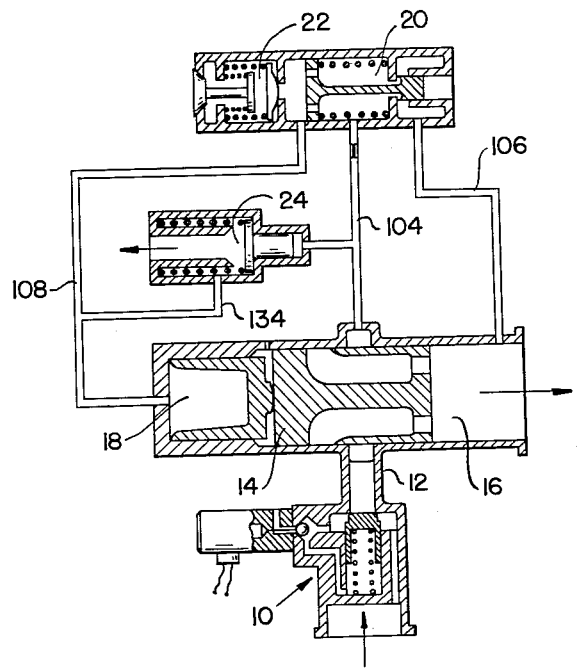
FIG. 1 is a schematic illustration of the pressure regulating apparatus of the present invention.

The pressure regulating apparatus shown in the drawings may be advantageously used in a variety of installations to control automatically the pressure within a fluid conduit. Particularly advantageous applications of the apparatus occur in aircraft engine starter systems of the pneumatic and fuel-air type.

Both penumatic and fuel-air starters for turbo-jet engines and the like are most effectively operated when the pressure of the air supplied thereto is controlled within close limitations. Pressurized air may be supplied to such starters from a portable ground compressor, or air may be supplied thereto, in multi-engine aircraft, from the compressor of an engine which has been previously started. It will be understood that in either event efficient pressure regulating means should be incorporated in the air supply conduits for such starters.

The pressure regulating apparatus of the present invention may be coupled in such air supply conduits automatically to exercise pressure control. In addition, and so that the flight engineer or the aircraft pilot may exercise control over starting of the aircraft engine there may be associated with the pressure regulating apparatus a remotely operable shut-off valve. In the embodiment shown a solenoid operated shut-off valve is incorporated in a unitary assembly with the pressure regulating apparatus of the invention.

The major components of the unitary assembly comprising the remotely operable shut-off valve and the pressure regulating apparatus of this invention are shown schematically in FIG. 1, the shut-off valve being indicated generally by the reference numeral 10. A housing 12 for the assembly is adapted to be coupled in a conduit so that fluid flow occurs in the said housing first through the shut-off valve 10 and then through a throttle valve 14 of the pressure regulating apparatus. (The arrows indicate the direction of flow through the housing 12 and hereinafter the upstream side of the throttle valve 14 may be referred to as the "high pressure side" while the downstream side may be referred to as the "low pressure side".)

The throttle valve 14 is reciprocable in the housing 12 and can be moved to an infinite number of open positions to control the pressure drop of the fluid from the high pressure to the low pressure side, thereby controlling and determining the fluid pressure on said low pressure side. Fluid at the low pressure side of the throttle valve 14 acts in a first chamber 16 to urge the said valve toward its closed position and fluid under pressure in a second chamber 18 urges the throttle valve 14 toward its open position.

Also included in the apparatus of the present invention is pressure regulating means for maintaining the fluid pressure in the second throttle valve chamber 18 at a substantially constant level. The said pressure regulating means comprises, in preferred form, a control or pressure regulating valve 20 which is disposed in a passageway carrying fluid from the high pressure side of the throttle valve 14 to the chamber 18 and which is operable to provide fluid at a substantially constant pressure for the chamber 18 by venting said passageway to a low pressure environment. Associated with the pressure regulating valve 20 is a pressure relief device 22 which limits the pressure in the second throttle valve chamber 18 in the event of malfunction of the said regulating valve.

The pressure regulating apparatus also includes a low pressure shut-off means comprising a minimum pressure valve 24 which is operable to close the throttle valve 14 when the pressure on the high pressure side of the said throttle valve drops below a predetermined level. To close the throttle valve 14, the said minimum pressure valve 24 is operable to vent the second chamber 18 to a low pressure environment, preferably to the atmosphere, when the fluid pressure on the throttle valve high pressure side drops below the said predetermined level.

Figure 2:
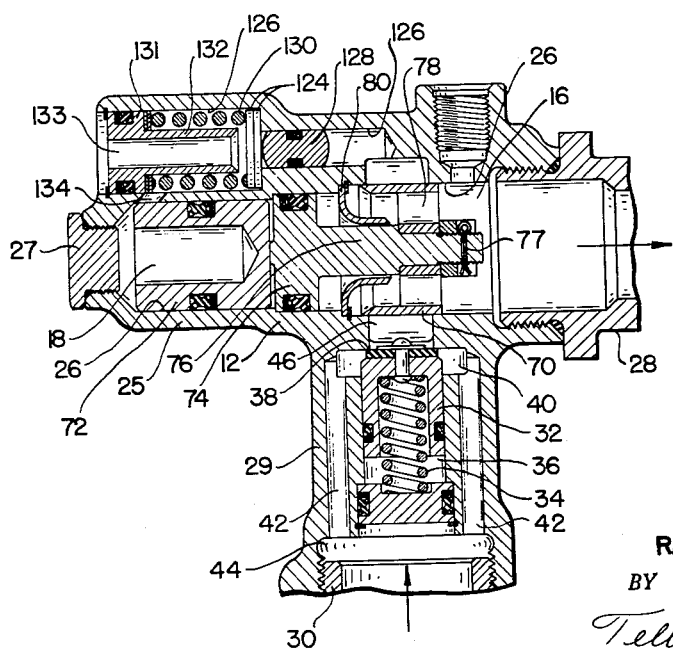
FIG. 2 is a vertical section of the apparatus taken longitudinally of the conduit in which the apparatus is adapted to be coupled.
Figure 3:
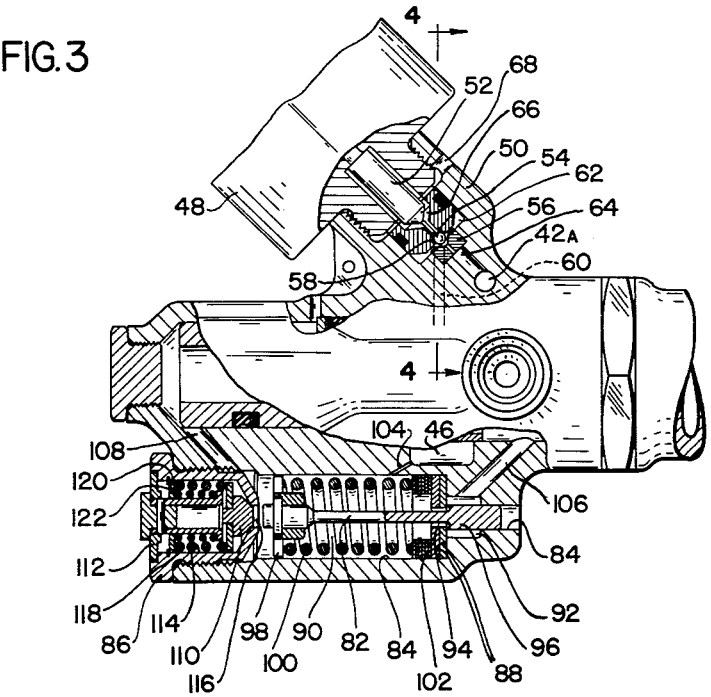
FIG. 3 is a top plan view of the apparatus partially in section.
Figure 4:
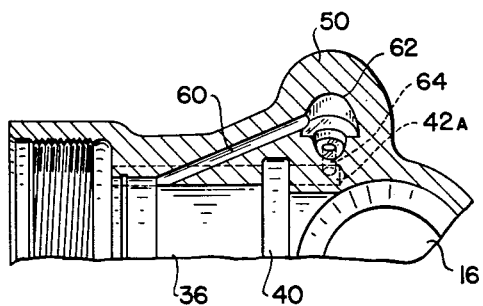
FIG. 4 is a vertical transverse section of a portion of the apparatus taken as indicated by the lines 4, 4 in FIG. 3.

As shown more particularly in FIGS. 2 to 4, the housing 12 has a generally cylindrical portion 25 provided with an axial bore 26 in which the throttle valve 14 is received for reciprocable movement. The bore 26 extends through the housing portion 25 and at one end thereof, there is secured to the said housing portion a detachable cap 27. The other end of the cylindrical housing portion 25 is threaded internally so as to be adapted for connection with a threaded end portion of a section of conduit 28. Extending radially from the cylindrical portion 25 of the housing 12 is a second portion 29 of the housing 12 enclosing the shut-off valve 10. The shut-off valve 10 is located in a radially extending opening in the housing second portion 29, which opening communicates with the bore 26 in the housing portion 25. The free end of the housing portion 29 is threaded internally for connection with a section of conduit 30. It will be seen that the radially extending opening in the housing portion 29 constitutes an inlet port for the housing 12 and that the axial bore 26 constitutes, at the threaded end of the housing portion 25, an outlet port for the housing 12.

The shut-off valve 10 comprises a valve member 32 reciprocable in the housing inlet port. The member 32 is urged upwardly or inwardly in the housing inlet port by a spring 34 and by fluid pressure in an actuating chamber 36 toward a valve seat 38 formed in the housing 12. Fluid under pressure in an inner chamber 40 formed in the housing portion 29 acts on an edge portion of the valve member 32 when the said member is in the closed position as shown and on the end surface of the said valve member when the valve is open to urge same downwardly and away from the seat 38. A plurality of vertically extending fluid passageways 42, 42 connect the inner chamber 40 with an outer chamber 44 formed in the housing portion 29 adjacent the end of the conduit section 30 and receiving fluid from the said conduit.

It will be seen that when the valve member 32 is moved downwardly or outwardly away from the seat 38, a flow of fluid under pressure will occur from the conduit section 30 through the chamber 44, the fluid passageways 42, 42, the inner chamber 40 and into an annular chamber 46. The annular chamber 46 constitutes a part of the housing inlet port and is defined in the housing 12 around the bore 26. Communication between the annular chamber 46 and the bore 26 is controlled by movement of the throttle valve 14.

As mentioned above, the shut-off valve 10 is adapted to be remotely controlled and is preferably solenoid operated. In FIG. 3 there is shown a portion of a solenoid 48 which is mounted on a pad 50 formed on the housing 12. A solenoid plunger or armature 52 is operable to move a small spherical valve member 54 between first and second valve seats 56 and 58. With the spherical valve member 54 positioned as shown in FIG. 3, a fluid passageway 42a, which is one of the passageways 42 extended upwardly in the housing 12 beyond the inner chamber 40, is thereby connected with a passageway 60 which communicates with the shut-off valve actuating chamber 36. The passageway 60 extends from the actuating chamber 36, as best illustrated in FIG. 4, upwardly and rearwardly in the housing 12 to a small chamber 62 in which the spherical valve member 54 is disposed. Also communicating with the chamber 62 is a fluid passageway 64 which extends therefrom to the passageway 42a extending upwardly from the chamber 40. Thus, when the spherical valve member 54 is positioned as shown by the solenoid 48, the shut-off valve actuating chamber 36 is supplied with high pressure fluid from the conduit section 30 through the passageways 42a and 60. When the valve member 54 is so positioned, the shut-off valve 10 is closed.

When the spherical valve member 54 is moved against the seat 56 by the solenoid plunger 52, the shut-off valve actuating chamber 36 is vented to atmosphere. An air passageway 66 surrounding the plunger 52 communicates with an atmospheric vent 68 in the housing 12. Movement of the valve member 54 against the seat 56 disconnects the passageways 42a and 60 and connects the passageways 66 and 60. With the shut-off valve actuating chamber 36 thus vented to atmosphere, the pressure of the fluid in the inner chamber 40 acting on the valve member 32 will urge it downwardly against the bias of the spring 34 to its open position.

The throttle valve 14 of the pressure regulating apparatus comprises, in preferred form, a substantially cylindrical valve member 70 which is reciprocable in the housing portion 25 for varying the area of the housing inlet port. That is, the valve member 70 is movable to vary the opening between the annular chamber 46 and the bore 26 in which the said member is reciprocable. The throttle valve 14 also includes piston means reciprocable in the bore 26, the said means preferably comprising abutting first and second pistons 72 and 74. The valve member 70 is connected to the piston means for reciprocable movement therewith and as shown the said member constitutes a skirt for a reduced diameter axial extension 76 of the piston 74. The said valve member is rigidly secured to the axial piston extension 76 as by a pin or key 77. Longitudinal openings 78, 78 in the valve member 70 allow fluid to flow rightwardly therethrough from the chamber 46 to the conduit section 28. A baffle 80 may be provided for directing flow from the annular chamber 46 rightwardly in the bore 26 toward the outlet end thereof.

It will be seen that the throttle valve 14 comprising the valve member 70 and the abutting pistons 72 and 74 cooperates with the housing portion 25 to define the first and second chambers 16 and 18. It will be further seen that fluid in the chamber 16 at throttle valve downstream pressure acts on the said throttle valve elements to urge the same leftwardly or in the inlet port closing direction. As mentioned above, the chamber 18 is supplied with fluid at a substantially constant pressure for urging the throttle valve 14 rightwardly or in the inlet port opening direction.

The throttle valve 14 assumes an infinite number of open positions depending on the fluid pressure upstream thereof; i.e., the pressure in the chamber 46, in providing a substantially constant downstream pressure. If, for example, the pressure in the annular inlet chamber 46 is relatively high, the throttle valve 14 will assume a position wherein the opening between the said chamber and the outlet chamber 16 is relatively small. The pressure drop across the throttle valve 14 in this instance must be relatively high so that the pressure in the outlet chamber 16 will be at the level necessary for balancing the pressure in the chamber 18. If, on the other hand, the pressure in the annular inlet chamber 46 is relatively low, a smaller pressure drop across the throttle valve 14 will provide the required balancing pressure in the outlet chamber 16. In this instance, therefore, the throttle valve 14 will assume a position wherein the opening between the inlet chamber 46 and the throttle valve outlet chamber 16 is relatively large.

The control or pressure regulating valve 20 which provides a constant fluid pressure in the throttle valve chamber 18 may take various forms within the scope of the invention. In preferred form, the said valve comprises an elongated cylindrical valve body or core 82 which is slidably received in a bore 84 in the housing 12. The bore 84 is of varying diameter over its length and extends through a suitable housing projection formed on the cylindrical housing portion 25 which encloses the throttle valve 14, as best illustrated in FIG. 3. A cap 86 is detachably secured to the said housing projection to close one end of the bore 84, the other end of said bore being open to the atmosphere. A pair of discs 88, 88 fixedly disposed in the bore 84 define with the walls of said bore first and second chambers 90 and 92 disposed on opposite sides of said discs. A port 94 extends axially through the discs 88, 88 and projecting through the port 94 is the valve core 82. A radial enlargement 96 formed integrally at one end of the valve core 82 is disposed in the chamber 92 and partially in the open end portion of the bore 84. At the opposite end of the core 82 and in the chamber 90 there is fixedly attached a guide and support member 98 for the said core, which member extends radially outwardly therefrom and slidably engages the walls of the bore 84. The guide and support member 98 is suitably apertured so that fluid may freely pass axially therethrough. A spring 100 in the chamber 90 embraces the valve core 82 and engages at one end the member 98 and at its opposite end a fixed spring seat 102 which is formed of a plurality of spacer rings engaging the discs 88, 88. A fluid passageway 104 of relatively small cross section connects the chamber 90 of the pilot valve 20 with the annular inlet chamber 46 and a passageway 106 of larger cross section connects the chamber 92 with the throttle valve outlet chamber 16. Another passageway 108 in the housing 12 connects the chamber 90 with the throttle valve chamber 18. Thus, the throttle valve chamber 18 is connected to the annular inlet chamber 46 for a supply of fluid under pressure through the control valve 20.

Operation of the control valve 20 to provide a substantially constant pressure in the throttle valve chamber 18 is described hereinbelow. The valve core 82 is urged leftwardly by the spring 100 so as to cause the radial enlargement 96 to close the port 94 in the discs 88, 88. Atmospheric air acting on the right-hand end of the core enlargement 96 in the open end of the bore 84 also urges the valve core 82 leftwardly. Fluid from the annular inlet chamber 46 in the control valve chamber 90 acts on the left-hand end of the core 82 and the left-hand end of the core enlargement 96 to urge said core rightwardly so that the said core enlargement will open the port 94.

It will be seen that, in providing a substantially constant pressure in the throttle valve chamber 18, the control valve core 82 assumes an infinite number of positions depending on the pressure of the fluid in the annular inlet chamber 46. When the pressure in the said chamber 46 is relatively high, the core 82 assumes a position wherein a relatively large opening at the port 94 is provided. This results in venting of a considerable amount of fluid from the small passageway 104 to the outlet chamber 16 through the port 94, the chamber 92 and the larger passageway 106. The pressure drop through the small passageway 104 is, as a consequence, relatively high and the pressure in the regulating valve chamber 90 and the throttle valve chamber 18 is maintained at the desired substantially constant level. On the other hand, when the pressure in the inlet chamber 46 is relatively low, the valve core 82 assumes a position wherein the opening at the port 94 is decreased. Less fluid is vented through the port 94 to the low pressure side of the throttle valve 14 and the pressure drop through the small passageway 104 is lower as required for maintaining pressure substantially constant in the chamber 18. Thus, the control valve 20 is operable to provide a substantially constant pressure in the throttle valve chamber 18 for a wide range of throttle valve inlet pressures by selectively venting different fluid flows to the throttle valve low pressure side.

The high pressure relief device 22 included in the pressure regulating apparatus of the invention comprises two relief valves 110 and 112 (FIG. 3) arranged in series in a bore 114 which is formed in the cap 86 associated with the control valve 20. The relief valve 110 is urged rightwardly by a spring 118 against the inner end of the cap 86 so as to close a vent port 16 formed in the said cap end. A stop ring 120 secured in the cap 86 and extending radially into the bore 114 serves as a seat for the spring 118. A second spring 122, also seated on the stop ring 120, urges the valve 112 rightwardly against the outer end of the cap 86 so as to close the end of the bore 114. The port 116 in the inner end of the cap 86 communicates with the chamber 90 of the control valve 20, the pressurized fluid in said chamber acting on the valve 110 to urge same leftwardly in the port opening direction. The spring 118 is considerably heavier than the spring 122 and is suitably selected so that the valve 110 will be moved to open the port 116 at a predetermined limit above the regulating pressure of the control valve 20.

If the fluid pressure in the chamber 90 exceeds the aforesaid predetermined pressure limit, as from a control valve malfunction, the valve 110 is moved leftwardly against the bias of the spring 118 to open the port 116. Fluid flow from the chamber 90 commences through the port 116 and said fluid acts upon the right-hand or inner surface of the valve 112 to open the same and relieve pressure in the chamber 90 to atmosphere. The function of the second relief valve 112 is to protect the relief valve 110 from atmospheric conditions, and more particularly, to prevent ice formation about the latter valve. This problem is, of course, ever present in high altitude and high performance jet aircraft of the type utilizing the pressure regulating apparatus of the present invention in their engine starting systems.

The minimum pressure valve 24 comprises, in preferred form (FIG. 2), a pair of discs 124, 124 slidably received in a multi-diameter bore 126 which is formed in an extended portion of the housing 12 adjacent the throttle valve enclosing portion 25 thereof. A piston 128 also slidably received in the bore 126 is urged leftwardly by fluid at throttle valve upstream pressure, the bore being extended in the housing 12 so as to communicate with the annular inlet chamber 46 for a supply of fluid therefrom. Urging the discs 124, 124 rightwardly is a spring 130 which is seated on a radially enlarged portion 131 of a generally cylindrical member 132. The member 132 is fixedly secured in the bore 126 and has an opening 133 extending axially therethrough. A fluid passageway 134, communicating with the bore 126, extends therefrom to the throttle valve chamber 18.

The minimum pressure valve 24 is shown in the open position wherein it operates to vent the throttle valve chamber 18 to atmosphere. It will be readily seen that when the shut-off valve 10 is opened allowing high pressure fluid to enter the annular inlet chamber 46 and the right-hand end of the bore 126 the piston 128 is urged thereby against the discs 124, 124 and in turn urges the said discs leftwardly toward the right-hand end of the member 132. As long as the throttle valve inlet pressure remains above a predetermined level, the left-hand disc 124 is maintained in engagement with the right-hand end of the member 132 to prevent fluid flow from the chamber 18 through the passageway 134 and the opening 133 in the member 132 to atmosphere. If, however, the pressure on the upstream side of the throttle valve drops below the said predetermined level, the spring 130 with the aid of the pressure of the fluid introduced to the bore 126 through the passageway 134 and acting on the left-hand disc 124 overcomes the force exerted by the piston 128 on the right-hand disc 124 and said discs are moved rightwardly to the positions shown. The throttle valve chamber 18 is thus vented to atmosphere through the passageway 134 and opening 133 in the member 132 whereupon the throttle valve 14 is moved to its furthermost left-hand and closed position.

From the foregoing, it will be seen that pressure regulating apparatus has been provided wherein large quantities of fluid flow may be accommodated at widely varying pressure conditions and wherein precise pressure control can be exercised. By providing a constant reference force for the throttle valve in the form of a fluid pressure acting over a constant area and regulated to a substantially constant level, the said throttle can be moved the considerable distances necessary for handling relatively large fluid flows without variation in the reference force. By so eliminating reference force variations which are encountered in all spring backed throttle valves and which are particularly detrimental to regulating accuracy, a substantially more precise control over pressure is achieved.

The invention claimed is:

Pressure regulating apparatus for a fluid conduit comprising a reciprocable throttle valve for the conduit, means defining a first chamber supplied with fluid from the low pressure side of the throttle valve for urging said valve toward its closed position, means defining a second chamber, means defining a passageway supplying said second chamber with fluid from the high pressure side of the throttle valve for urging said valve toward its open position, said fluid pressures being the only substantial forces tending to move said throttle valve, a control valve disposed in said passageway and operable to maintain the fluid pressure in said second chamber substantially constant whereby to establish a substantially constant pressure downstream of said throttle valve, a pressure relief device associated with said control valve and operable to vent said passageway to a low pressure environment when the fluid pressure in said passageway exceeds a predetermined level, said pressure relief device comprising inner and outer relief valves arranged in series provided with effective pressure areas of sizes which differ and which provide for opening of said valves respectively at said predetermined pressure level and at a lower pressure level, the said outer valve thus serving to protect the inner valve from atmospheric conditions, and low pressure shut-off means operable to close the said throttle valve when pressure on the high pressure side thereof drops below a predetermined level.

References Cited in the file of this patent

UNITED STATES PATENTS

| | | |
|---|---|---|
| 841,469 | Turner | Jan. 15, 1907 |
| 2,005,445 | Wiedhofft | June 18, 1935 |
| 2,146,273 | Smith | Feb. 7, 1939 |
| 2,731,033 | Cable | Jan. 17, 1956 |
| 2,808,068 | Thomas | Oct. 1, 1957 |
| 2,813,402 | Poethig et al. | Nov. 19, 1957 |
| 2,856,147 | Knapp | Oct. 14, 1958 |
| 2,884,003 | Jensen | Apr. 28, 1959 |
| 2,963,039 | Dietz | Dec. 6, 1960 |
| 2,969,806 | Jensen et al. | Jan. 31, 1961 |